Figure 1:
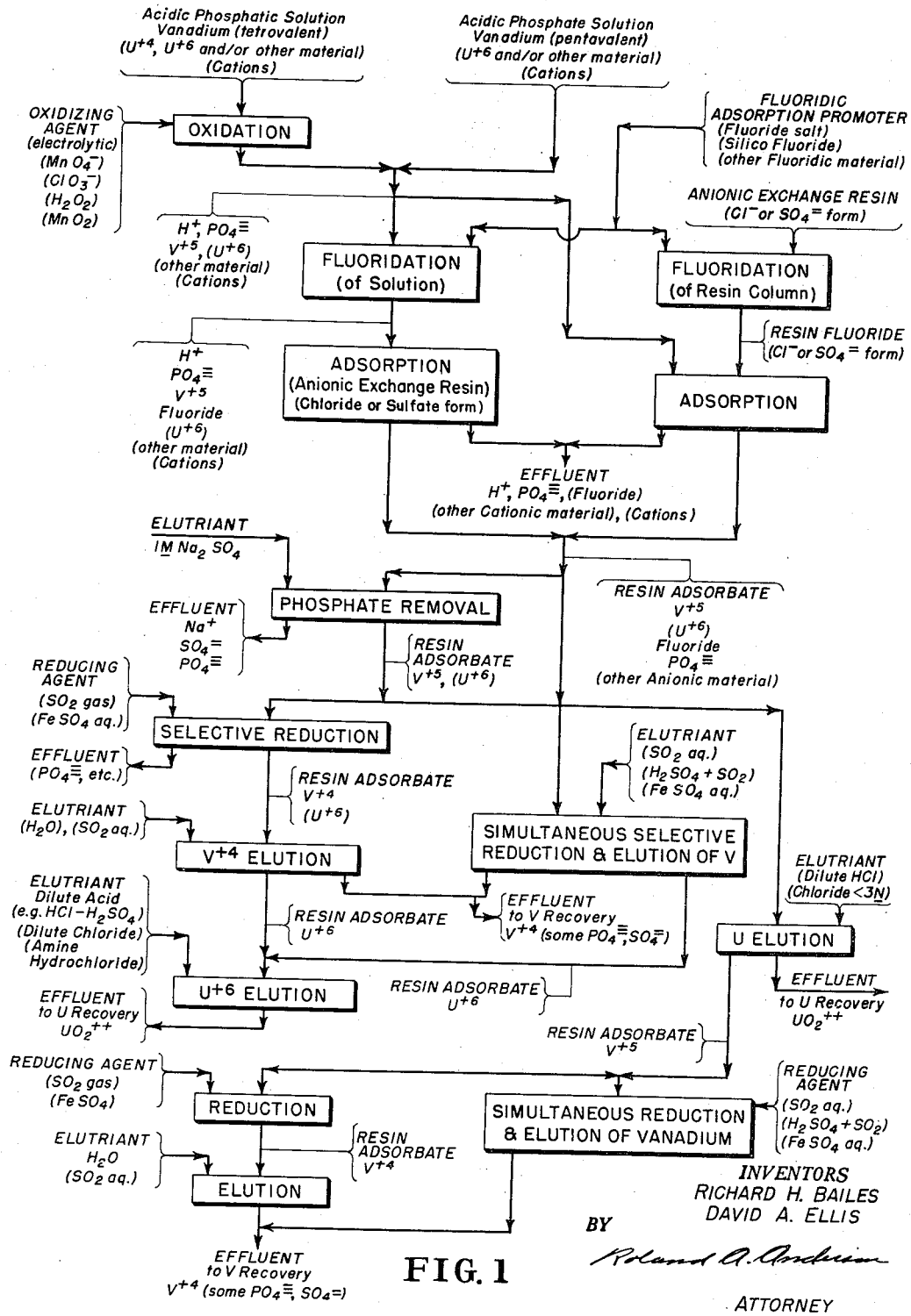

INVENTORS
RICHARD H. BAILES
DAVID A. ELLIS
BY
ATTORNEY

INVENTORS
RICHARD H. BAILES
DAVID A. ELLIS

ATTORNEY

United States Patent Office 2,849,279
Patented Aug. 26, 1958

2,849,279

CATALYTIC PROMOTION OF THE ADSORPTION OF VANADIUM ON AN ANIONIC EXCHANGE RESIN

Richard H. Bailes, Walnut Creek, and David A. Ellis, Concord, Calif., assignors, by mesne assignments, to the United States of America as represented by the United States Atomic Energy Commission Application October 7, 1952, Serial No. 313,558

8 Claims. (Cl. 23—14.5)

The present invention relates, in general, to the adsorption of pentavalent vanadium on an anionic exchange material and, more particularly, to the use of a catalytic agent to promote the adsorption of pentavalent vanadium anions on an anionic exchange resin as, for example, in a purification or separation process.

As has been disclosed in the copending applications of Richard H. Bailes and Ray S. Long, Serial Nos. 165,532 and 159,744, filed June 1, 1950, and May 3, 1950, respectively, pentavalent vanadium produced in acidic phosphatic solutions having a complex composition may be adsorbed by anionic exchange resins. Application Serial No. 159,744 issued as Patent No. 2,756,123 on July 24, 1956. Application Serial No. 165,532 issued as Patent No. 2,830,874 on April 15, 1958. Subsequently, the adsorbed anionic pentavalent vanadium complex is eluted by variously modified processes to effect separation and purification of the vanadium and/or other material with which it was associated in the original acidic phosphatic solution.

Various investigators, including the present inventors, have found, however, that the pentavalent vanadium is not adsorbed at all or is only very slowly adsorbed by anionic exchange resins from acidic phosphatic or phosphoric acid solutions of more purified compositions. Indeed, the lack of success in obtaining such anionic adsorption of vanadium from such purified solutions appears to have stymied progress in the utilization of anionic exchange recovery and purification processes prior to the successful accomplishments disclosed in the aforesaid applications of Bailes and Long.

Now the present inventors have discovered that the addition of catalytic amounts of materials which supply effective concentrations of fluoride ion ($F^-$) to such phosphatic solutions promotes or greatly accelerates the adsorption of pentavalent vanadium therefrom by an anionic exchange resin. Accordingly, vanadium solutions which hitherto were not amenable to treatment by anionic exchange processes such as those disclosed in said copending applications may now be processed therein following appropriate treatment with the anionic exchange promoter of the present invention.

It is therefore a prime object of the present invention to introduce materials, which supply effective concentrations of fluoride ion, into pentavalent vanadium solutions to promote the anionic exchange adsorption of pentavalent vanadium therefrom.

Another object of the invention is to employ materials of the class which supply effective concentrations of fluoride ions in phosphatic solutions to accelerate or otherwise promote the adsorption of pentavalent vanadium therefrom and upon an anionic exchange resin contacting such solution.

A further object of the invention is to provide a process for purifying and recovering vanadium including the promotion of anionic adsorption of pentavalent vanadium on an anionic exchange resin by means of a source of fluoride ion added to the solution.

A still further object of the invention is to add a soluble fluoridic material to phosphatic vanadium solutions to promote rapid and increased pentavalent anionic vanadium adsorption therefrom by anionic exchange resins.

Figure 2:
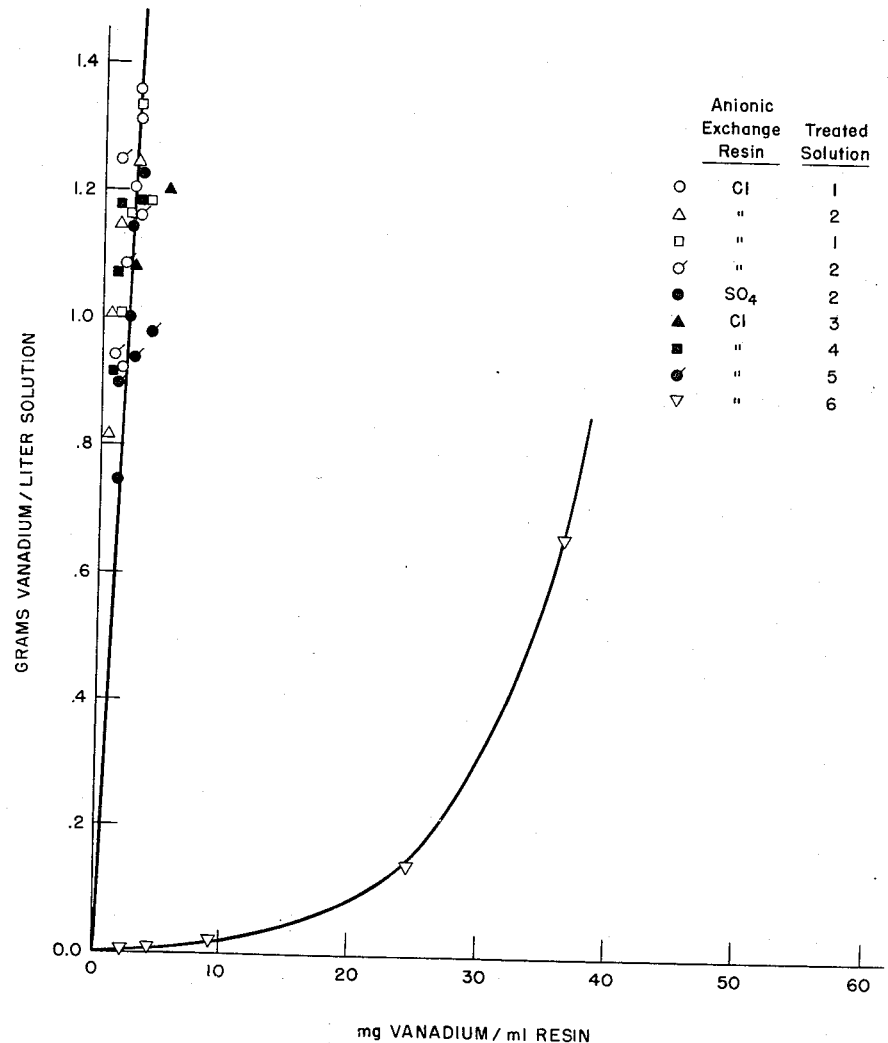
Figure 3:
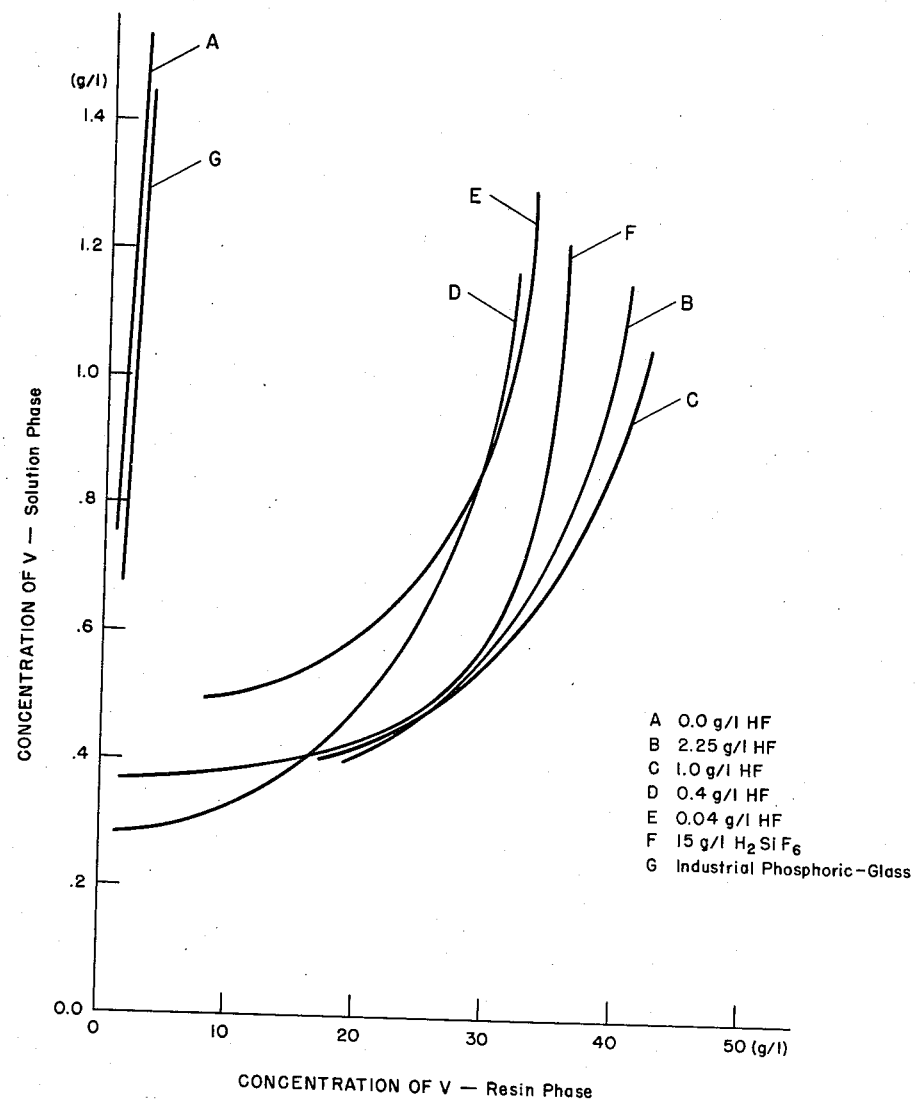

Other objects and advantageous features of the present invention will become apparent from consideration of the following description taken in conjunction with the accompanying drawing, of which:

Figure 1 is a flow sheet illustrating the process of the invention;

Figure 2 is a graphical representation of the results obtained in equilibrium experiments indicating the low vanadium adsorptions obtained in phosphatic solutions of simple composition as compared with that normally obtained from an impure industrial phosphoric acid; and Figure 3 is a graphical representation of the highly beneficial results obtained in the anionic adsorption exchange of pentavalent vanadium when using the promoter of the invention.

In general, as illustrated in Fig. 1 of the drawing, the anionic exchange processes with which the present invention may be employed includes the treatment of solutions, particularly, phosphatic solutions, containing pentavalent vanadium. For example, such a process may include the production of an acidic phosphatic solution containing a pentavalent anionic form of vanadium and subsequent adsorption of the anionic vanadium therefrom upon an anionic exchange resin. Following adsorption, the resin adsorbate may then be treated by a variety of procedures to effect purification and/or selective elution of the vanadium.

In particular, the present invention may be employed to effect an adsorption of pentavalent anionic vanadium from recalcitrant phosphatic solutions whereby such recalcitrant solutions are rendered amenable to treatment by the processes disclosed in the aforesaid applications of Bailes and Long. As disclosed in the said applications of Bailes and Long, crude phosphoric acid solutions (or other acidic phosphatic solutions) which contain vanadium together with uranium, fluoride, and a variety of other materials are treated with powerful oxidizing agents whereby the vanadium is oxidized to the pentavalent state. Such oxidation may be effected by means of various agents including electrolytic oxidation, permanganate, chlorate, hydrogen peroxide, and manganese dioxide. Following oxidation the solution is passed through an anionic exchange resin column preferably of the strongly basic type of anionic exchange resin whereupon the pentavalent vanadium complex anions, uranyl complex anions, and certain other anionic materials are adsorbed therefrom by the resin. Cationic materials are not adsorbed and, therefore, remain in the effluent. Subsequent to adsorption, the vanadium is eluted from the column either before or after other materials have been washed or eluted therefrom by a procedure including reduction of the vanadium to the tetravalent state and elution as a cation. The effluent acidic phosphate solution may then be returned to a plant for phosphate recovery or other appropriate treatment.

Sulfur dioxide gas or ferrous sulfate solution may be used for the purpose of selectively reducing the vanadium to the tetravalent state in situ and in the presence of uranium and/or for reducing the vanadium prior to elution thereof. Simultaneous selective reduction and elution of the vanadium may be effected with an aqueous solution of sulfur dioxide, sulfur dioxide in dilute sulfuric acid, or ferrous sulfate.

In the event that sulfur dioxide gas is employed as the reducing agent, to selectively reduce the adsorbed vanadium, in situ, water or an aqueous solution of sulfur dioxide may be used to elute the tetravalent vanadium as a cation. The sulfur dioxide elutriant removes phosphate from the resin and, therefore, subsequent elution of uranium is contaminated to a lesser extent therewith. Sodium sulfate solution of about 1 M concentration may, optionally, be employed to elute the phosphate prior to the elution of the vanadium thereby allowing the vanadium to be obtained in a solution having reduced phosphate contamination. Such vanadium may be further purified and finally recovered as by the process disclosed in the copending application of Richard H. Bailes and Robert R. Grinstead, Serial No. 291,946, filed June 6, 1952, now Patent No. 2,770,522, granted November 13, 1956. Uranium adsorbed on the resin as a uranyl phosphate complex anion may be selectively removed prior to elution of the vanadium by employing a dilute hydrochloric acid or chloride salt solution having an effective concentration less than about 3 N. The vanadium is then eluted after reduction or by simultaneous reduction and elution as noted above. Following elution of the vanadium and/or phosphate the adsorbed uranium is eluted with a variety of agents including acid solutions, dilute chloride solutions, solutions of hydrochloride salts of various amines, and treatment with concentrated chloride salt solutions followed by elution with water. Such uranium may then be recovered by any appropriate method.

Accordingly, it may be seen, the operation of such a process wherein both pentavalent vanadium and uranium are adsorbed on an anionic exchange resin may result in the purification, separation and recovery of vanadium with or without the recovery of uranium. The present invention extends the utility of such a process to those solutions from which, heretofore, pentavalent vanadium could not be adsorbed or could be only poorly adsorbed, as will now be disclosed.

In the event that the phosphatic solution is recalcitrant with respect to the adsorption of pentavalent anionic vanadium therefrom, i. e., in the event that the solution is deficient in the required anionic adsorption characteristic stemming from an insufficiency or unavailability of fluoride content, it is treated, in accordance with the present invention, with a fluoridic anionic exchange promoter at any convenient time prior to a subsequent anionic adsorption. It is considered that any fluoridic material which is capable of supplying an effective concentration of fluoride ion in the solution is suitable. For example, the soluble fluoride salts, such as alkali metal fluorides, silicofluorides, hydrofluoric acid, and normally insoluble fluorides such as calcium fluoride which can react with or dissolve in an acidic phosphatic solution to yield fluoride ions therein, may be so employed. While such material may be added to the solution at any time prior to the adsorption step, the material may also be applied to the resin prior to contact with the solution. In any event only a small amount of the promoter is required as the effect appears to be a catalysis promoted by fluoride.

Following treatment with the adsorption promoter of the invention, the solution may now be contacted with an anionic exchange material to adsorb the pentavalent vanadium therefrom. Preferably, a highly basic anionic exchange resin, e. g., a quaternary ammonium base type is employed in a column for this purpose. Dowex 1 and Dowex 2, strongly basic anionic exchange resins, employed in the various operations of the following description and illustrative examples, are stated by the manufacturer to be equivalent in function and substantially the same. These materials are manufactured by procedures which are substantially the same as those described in Examples 2 and 4 of U. S. Patent No. 2,614,099, filed December 29, 1948, and issued October 14, 1952. Following adsorption, the column may then be treated in any appropriate process including the various processes disclosed above to separate, purify, and recover the vanadium and uranium, as desired.

Further details of the manner in which the anionic exchange adsorption promoter of the invention is employed to obtain the beneficial results, as well as theoretical aspects of the process, will become apparent by consideration of the following examples:

EXAMPLE I

The necessity for the fluoride ion adsorption promoter is clearly demonstrated by the adsorption results obtained with synthetic solutions and crude industrial phosphoric acid solution when contacted with anionic exchange resins having various replaceable anions thereon. Such synthetic solutions were prepared from 30% C. P. phosphoric acid and pure chemical compounds as indicated in the following:

(1) $H_3PO_4 + V_2O_5$ (1.40 g. V/liter)
(2) $H_3PO_4 + UO_2SO_4 + V_2O_5$ (1.27 g. V/liter) (137.9 mg. $U_3O_8$/liter)
(3) Solution (2) +12.55 g. $SO_4$/liter as $H_2SO_4$
(4) Solution (3) partially reduced with $SO_2$
(5) Solution (3) reduced with $SO_2$ and then oxidized with $MNO_2$ For comparison a crude industrial phosphoric acid having the following composition and identified as "6" is included:

| | | |
|---|---|---|
| $P_2O_5$ | percent | 20.6 |
| S | do | 0.66 |
| Fe | do | 0.28 |
| $Al_2O_3$ | do | 0.75 |
| CaO | do | 0.29 |
| MgO | do | 0.31 |
| Si | do | 0.09 |
| F- | do | 1.17 |
| $V_2O_5$ | do | 0.26 |
| NaK | do | 0.05 |
| Sp. G | | 1.21 |

Portions of the above solutions were shaken with quantities of a highly basic anionic exchange resin (Dowex 2 having either chloride or sulfate exchangeable anions) until equilibrium conditions were approached. The supernatant solutions were then analyzed for uranium and vanadium and the amount adsorbed by the resin was calculated as the difference between the original and final analyses of the solutions. These results are graphically illustrated in Fig. 2.

As may be seen from the graphs of said Fig. 2, the vanadium adsorption from the synthetic solutions is very low relative to the adsorption from the crude industrial phosphoric acid. Also, it may be seen, that neither oxidation nor reduction nor the presence of uranium, chloride, sulfate or manganese affects the adsorption from such solutions. Uranium adsorption (anionic uranyl phosphate) was normal from solution 2. Therefore, it may be seen that some factor capable of promoting adsorption and which is present in the crude acid is clearly lacking in the synthetic solutions.

EXAMPLE II

Upon further consideration and investigation, it was discovered that the addition of fluoridic materials to a synthetic phosphoric acid solution containing pentavalent vanadium obviated the anionic adsorption difficulties. The remarkable efficacy of the adsorption promoter is evident from the results of the following experiments: First there was prepared a series of solutions with the compositions indicated in the following table by dissolving identical amounts of $V_2O_5$ and variable amounts of fluoridic materials in 30% C. P. phosphoric acid. These solutions were then mixed with portions of highly basic anionic exchange resin and samples were taken over an extended period of time as indicated in said table and as the vanadium distribution between the resin and solution phases approached equilibrium. The results of the resin adsorption, as well as a comparable adsorption of vanadium from an oxidized industrial phosphoric acid by glass powder, are shown in Fig. 3.

Table
VANADIUM EXCHANGE EQUILIBRIUM IN SYNTHETIC SOLUTIONS

| Curve | Resin | Acid | Gram V/l. solution | Mg. V/ml. resin |
|---|---|---|---|---|
| A | Dowex 1, 100-mesh 6% cross linkage (shaken 21 hrs.) | 30% $H_3PO_4$+V | 1.33<br>1.32<br>1.27<br>1.23<br>1.12<br>0.90 | 2<br>2<br>2<br>1.6<br>1.6<br>1.1 |
| B | Dowex 2, 100-mesh regular cross linkage (shaken 16 hrs.) | 30% $H_3PO_4$+V+2.25 gram HF/l. | 0.95<br>0.75<br>0.42<br>0.39<br>0.40 | 38.7<br>35.2<br>21.0<br>5.83<br>2.18 |
| C | Dowex 2, 100-mesh regular cross linkage (shaken 19 hrs.) | 30% $H_3PO_4$+V+1 gram HF/l. | 0.88<br>0.41<br>0.39<br>0.41 | 39.6<br>18.0<br>6.57<br>2.07 |
| D | Dowex 1, 100-mesh 6% cross linkage (shaken 18 hrs.) | 30% $H_3PO_4$+V+0.4 gram HF/l. | 0.98<br>0.78<br>0.44<br>0.37<br>0.32<br>0.27 | 30.8<br>28.4<br>18.2<br>13.4<br>7.62<br>2.60 |
| E | Dowex 1, 100-mesh regular cross linkage (shaken 19 hrs.) | 30% $H_3PO_4$+V+0.04 gram HF/l. | 0.95<br>0.77<br>0.69<br>0.59<br>0.50<br>0.36 | 30.8<br>27.4<br>12.9<br>9.4<br>5.21<br>2.23 |
| F | Dowex 1, 100-mesh regular cross linkage (shaken 17 hrs.) | 30% $H_3PO_4$+V+15 gram/l. $H_2SiF_6$ | 0.89<br>0.60<br>0.37<br>0.32<br>0.27<br>0.26 | 37.1<br>31.2<br>17.3<br>13.2<br>7.3<br>2.6 |
| G | 100-mesh glass (shaken 22 hrs.) | Oxidized crude industrial phosphoric acid | 1.22<br>1.24<br>1.18 | 4.0<br>2.0<br>0.9 |

As may be seen from curves A and G of Fig. 3, the anionic resin adsorption of pentavalent vanadium from a synthetic solution which does not contain a fluoridic material is of about the same very low order of magnitude as adsorption by glass, i. e., the adsorption is very slow. However, the anionic exchange adsorption, by the resin, in the presence of soluble fluoridic materials (F- ions) may be seen to be rapid and relatively complete as indicated by the asymptotic shape of curves B through F.

The mechanism for the promotion of adsorption by the fluoridic materials is not fully understood. However, the position of the lower portion of curve E, where only 0.04 g./l. of HF was employed, indicates a slow rate of adsorption which may be even slower with lower proportions of fluoride present. This phenomena indicates that equilibrium was probably not reached in the time allowed with the very low concentration of fluoride limiting the rate. As the amount of vanadium adsorbed from this solution E was at least ten equivalents for each equivalent of fluoride present, it is obvious that the particular form in which the vanadium is finally adsorbed is not a fluoride complex. Hence, the foregoing suggests that the fluoride may temporarily complex the dissolved pentavalent vanadium to accomplish the adsorption whereupon the fluoride is released to temporarily complex more vanadium and repeat the cycle.

With such a catalytic mechanism the equilibrium amount of vanadium adsorbed will not be a function of the fluoride concentration but the rate of adsorption of the vanadium will be a function of fluoride concentration as may be noted from the foregoing. Also, as the fluoride does not appear to be consumed to any considerable extent in the process, it may be seen that the fluoride acts as a truly catalytic promoter.

While there has been described in the foregoing what may be considered to be preferred embodiments of the invention, various modifications may be made therein without departing from the teachings of the invention and it is intended to cover all such modifications as fall within the scope of the appended claims.

What is claimed is:

1. In a process for recovering vanadium from an anionic exchange recalcitrant acidic phosphatic solution, the steps comprising oxidizing the vanadium in the solution to the pentavalent state, adding a fluoridic anionic exchange promoter to the solution, contacting said solution with an anionic exchange resin whereby the adsorption of the pentavalent vanadium is effectuated thereon by said promoter, and eluting said vanadium from said resin.

2. In a process for recovering vanadium from an anionic exchange recalcitrant acidic phosphate solution, the steps comprising oxidizing the vanadium in the solution to the pentavalent state, adding to said solution a fluoridic material selected from the group consisting of soluble fluoride salts, hydrofluoric acid, silicofluorides and normally insoluble fluoride salts capable of reacting with and dissolving in said solution, contacting said solution with an anionic exchange resin whereby the adsorption of the pentavalent vanadium is effectuated thereon by said fluoridic material, and eluting said vanadium from said resin.

3. In an anionic exchange process for recovering vanadium from a material, the steps comprising producing an acidic phosphatic solution of said material containing the vanadium in the pentavalent oxidation state, said solution being recalcitrant and deficient in the required pentavalent anionic vanadium exchange adsorption characteristic, treating an anionic exchange resin column with a fluoridic adsorption promoter, contacting said solution with said treated resin column whereby the adsorption of pentavalent vanadium is effectuated thereon by said fluoridic promoter, and eluting the vanadium from the resin.

4. In an anionic exchange process for recovering vanadium and uranium values from an oxidized acidic phosphatic solution which is recalcitrant and deficient in the required pentavalent anionic vanadium exchange characteristic, the steps comprising adding a fluoridic anionic exchange promoter to said solution, contacting said solution with an anionic exchange resin column, whereby hexavalent uranium and pentavalent vanadium complex anions are adsorbed thereon, selectively eluting the uranium from the resin with an elutriant selected from the group consisting of dilute hydrochloric acid and chloride salt solution of less than 3 N concentration, and then simultaneously reducing and eluting vanadium therefrom with an elutriant selected from the group consisting of aqueous solutions of $SO_2$, $H_2SO_4+SO_2$ and $FeSO_4$.

5. In an anionic exchange process for recovering vanadium and uranium values from an oxidized acidic phosphatic solution which is recalcitrant and deficient in the required pentavalent anionic vanadium exchange characteristic, the steps comprising adding a fluoridic anionic exchange promoter to said solution, contacting said solution with an anionic exchange resin column, whereby hexavalent uranium and pentavalent vanadium complex anions are adsorbed thereon, selectively eluting the uranium from the resin with an elutriant selected from the group consisting of dilute hydrochloric acid and chloride salt solution of less than 3 N concentration, reducing the vanadium to the tetravalent state on the resin with a material selected from the group consisting of $SO_2$ gas and $FeSO_4$ solution, and eluting the tetravalent vanadium as a cation from the resin.

6. In an anionic exchange process for recovering vanadium and uranium values from an oxidized acidic phosphatic solution which is recalcitrant and deficient in the required pentavalent anionic vanadium exchange characteristic, the steps comprising adding a fluoridic anionic exchange promoter to said solution, contacting said solution with an anionic exchange resin column, whereby hexavalent uranium and pentavalent vanadium complex anions are adsorbed thereon, simultaneously selectively reducing and eluting vanadium as a tetravalent cation from the resin with an elutriant solution of a material selected from the group consisting of $SO_2$, $H_2SO_4+SO_2$ and $FeSO_4$, and eluting uranium from the resin.

7. In a process wherein pentavalent vanadium anionic complexes are absorbed on a strongly basic anionic exchange resin from an acidic phosphatic solution, the step comprising adding a soluble fluoridic material to a recalcitrant acidic phosphatic solution of pentavalent vanadium to provide said acidic phosphatic solution wherefrom adsorption of said pentavalent vanadium anionic complexes is promoted and effected.

8. The process as otherwise defined in claim 7 but wherein said soluble fluoridic material comprises a material selected from the group consisting of soluble fluoride salts, silicofluorides, and insoluble fluoride salts dissolvable in said phosphatic solution to provide an appreciable concentration of fluoride ions therein.

References Cited in the file of this patent

UNITED STATES PATENTS 2,756,123     Bailes et al.  ------------ July 24, 1956

OTHER REFERENCES

Mellor: Modern Inorganic Chemistry, new edition, revised and edited 1951, page 492. Publ. by Longmans, Green & Co., London.